United States Patent [19]

Murray

[11] Patent Number: 5,081,851
[45] Date of Patent: Jan. 21, 1992

[54] ABSORPTION REFRIGERATION SYSTEM PURGE SUBSYSTEM

[75] Inventor: Joseph G. Murray, Worthington, Ohio

[73] Assignee: Gas Research Institute, Chicago, Ill.

[21] Appl. No.: 687,130

[22] Filed: Apr. 18, 1991

[51] Int. Cl.⁵ .................... F25B 43/04; F25B 15/00
[52] U.S. Cl. ........................................... 62/475; 62/85
[58] Field of Search ............. 62/476, 475, 144, 85, 62/86

[56] References Cited

U.S. PATENT DOCUMENTS

| Re. 23,093 | 3/1949 | Roswell | 62/475 |
|---|---|---|---|
| 2,353,859 | 7/1944 | Thomas | 62/475 |
| 2,363,381 | 11/1944 | Anderson, Jr. | 62/475 |
| 2,367,708 | 1/1945 | Anderson, Jr. | 62/475 |
| 2,374,521 | 4/1945 | Anderson, Jr. | 62/475 |
| 2,384,860 | 9/1945 | Thomas | 62/475 |
| 2,384,861 | 9/1945 | Roswell | 62/475 |
| 2,400,138 | 5/1946 | Buffington | 62/475 |
| 2,432,978 | 12/1947 | Anderson, Jr. | 62/475 |
| 2,510,730 | 6/1950 | Whitlow | 62/475 |
| 2,510,737 | 6/1950 | Buffington | 62/475 |
| 3,131,546 | 5/1964 | Osborne | 62/475 |
| 3,309,894 | 3/1967 | Tamada | 62/475 |
| 3,360,950 | 1/1968 | Osborne | 62/475 |
| 3,367,135 | 2/1968 | Greacen et al. | 62/475 |
| 4,467,623 | 8/1984 | Reimann | 62/475 |
| 4,531,375 | 7/1985 | Zinsmeyer | 62/85 |

Primary Examiner—Albert J. Makay
Assistant Examiner—William C. Doerrler
Attorney, Agent, or Firm—Watkins, Dunbar & Pollick

[57] ABSTRACT

An absorption refrigeration system having an absorber, a generator, and a refrigeration solution pump which flows relatively dilute refrigeration solution received from the absorber to the generator includes a novel purge subsystem which purges un-wanted, non-condensed gases along with some refrigerant vapor from the absorber and flows such gases to the pump inlet for subsequent flow to the generator at system operating pressures substantially greater than atmospheric pressure. The so-flowed gases are separated from the refrigerant in the generator, are isolated in a collector unit, and afterwards periodically either manually or automatically vented from the collector unit to the atmosphere at the system high side operating pressure.

6 Claims, 2 Drawing Sheets

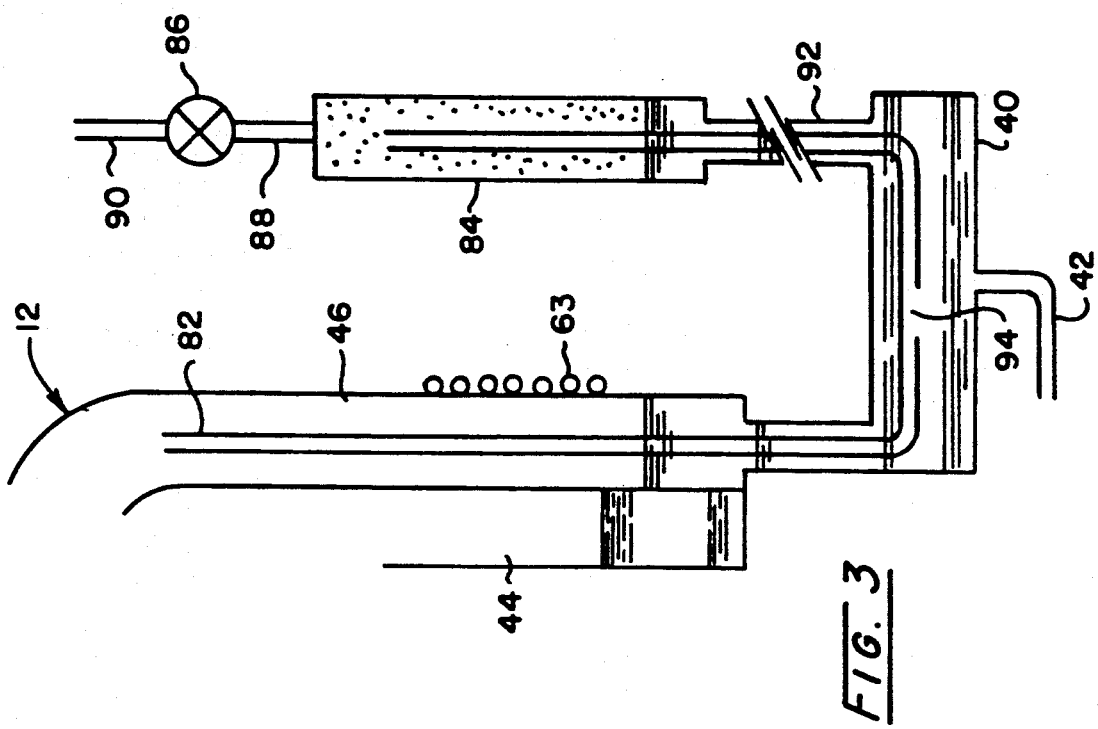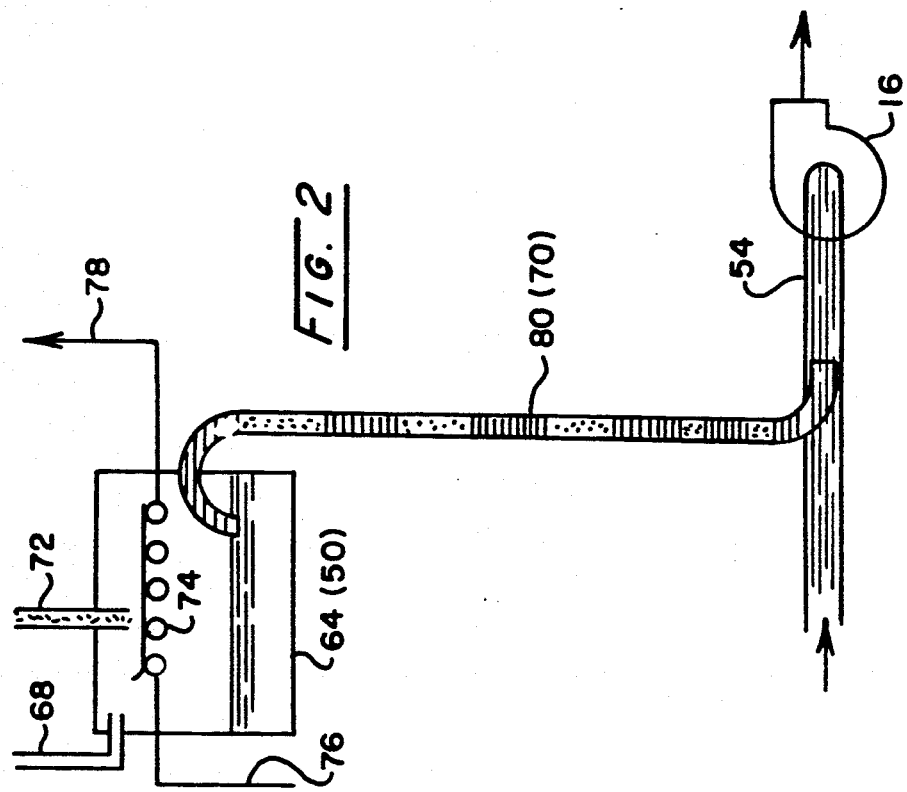

ABSORPTION REFRIGERATION SYSTEM PURGE SUBSYSTEM

FIELD OF THE INVENTION

This invention relates generally to an absorption refrigeration system, and particularly concerns a method and apparatus for purging so-called non-condensible gases from the refrigeration system absorber element to the atmosphere using system inherent operating pressures which are significantly greater than atmospheric pressure.

BACKGROUND OF THE INVENTION

It is common practice in the design, manufacture, and operation of known absorption refrigeration system arrangements to provide for the purging of so-called non-condensible gases from the system absorber element to the atmosphere. Many of such known systems separate the unwanted non-condensible gases from the apparatus vaporized refrigerant (usually water vapor) at pressures very nearly equal to the system absorber element subatmospheric operating pressure, store the separated gases in an appropriate vessel at or near the separation pressure, and then periodically or continuously operate an included exhaust vacuum pump to vent the collected and unwanted gases to the atmosphere using vacuum pump discharge pressures greater than atmospheric pressure. An example of such systems is the absorption refrigeration system disclosed by U.S. Pat. No. 2,384,861 issued in the name of Roswell and assigned to Servel, Inc. of New York, New York. Other patents assigned to Servel, Inc. and disclosing similar absorption refrigeration apparatus include U.S. Pat. Nos. 2,363,381; 2,367,708 and 2,432,978 issued in the name of Anderson, Jr., U.S. Pat. No. 2,384,860 issued in the name of Thomas, U.S. Pat. No. 2,510,730 issued in the name of Whitlow, and U.S. Pat. No. 2,510,737 issued in the name of Buffington.

Other known absorption refrigeration systems utilize a refrigeration solution pump that pumps relatively weak or dilute absorption refrigeration solution and entrained non-condensible gases from the apparatus absorber low-pressure side to the apparatus generator high pressure side and require that the purging operation be periodically shut down, as in the case of U.S. Pat. No. 4,467,623 to Reimann, if separated and accumulated unwanted, non-condensible gases are to be vented to the atmosphere at system high-side pressures. See also, in this regard, U.S. Pat. Nos. 3,360,950 issued to Osborne and 3,367,135 issued in the names of Greacen et al.

I have discovered that various changes may be made in the construction and operation of a sub-atmospheric absorption refrigeration system to permit the purging of unwanted, non-condensible gases from the system to the atmosphere without having to pump the separated gases as by a separate vacuum purge pump having a discharge pressure above ambient atmospheric pressure, either with such pump being incorporated permanently into the system or being used only when specially connected to the system intermittently as by a service mechanic during the course of a service call. Also, the purge system of this invention may be made to operate either fully automatically or in response to manual control inputs without requiring that operation of the refrigeration system in any respect be inactivated in order to permit the venting of accumulated non-condensible gases to the atmosphere using inherently present system operating pressures which are greater than atmospheric pressure.

SUMMARY OF THE INVENTION

The purge system of this invention has application to sub-atmospheric absorption refrigeration apparatus of the type using a lithium bromide and water refrigeration solution pair and having conventional evaporator, absorber, generator, and condenser elements with dilute refrigeration solution being pumped from the apparatus absorber low-pressure side to the apparatus generator high-pressure side by a conventional solution pump. A purge tube having an inlet appropriately positioned in the apparatus absorber chamber conducts any unwanted non-condensible gases present in the absorber chamber, together with any excess refrigerant vapor present, to an auxiliary absorber which receives such gases for low-pressure differential pumping and which is driven by a subsequently cooled bleed fraction of the condensed concentrated refrigeration solution otherwise flowed to the apparatus absorber element. Non-condensible gases thus purged from the absorber element by the auxiliary absorber element are flowed along with the bleed refrigeration solution by a conventional connected fall tube (syphon) means to the inlet of the solution pump element for elevation to the apparatus high-pressure generator element side. Subsequently the non-condensible gases are separated from the refrigeration solution in the system generator and continuously conducted to a storage chamber for accumulation and periodic venting to the atmosphere using an included valve and vent that may be manually or automatically activated. If automatic venting is preferred, the valve means is normally controlled to an open or closed condition in response to a sensed temperature condition in the non-condensible gas storage chamber.

The foregoing and other advantages of the invention will become apparent from the following disclosure in which a preferred embodiment of the invention is described in detail and illustrated in the accompanying drawing. It is contemplated that variations in the structural features and arrangement of parts may appear to the person skilled in the art without departing from the scope or advantages of the invention defined by the included claims.

DESCRIPTION OF THE DRAWINGS

FIG. 2 is an enlarged sectional schematic view of the auxiliary absorber and fall tube arrangement of the FIG. 1 system illustrating a preferred means for the low-pressure differential pumping of unwanted non-condensible gases to the system solution pump inlet.

FIG. 3 is an enlarged sectional elevational view of a portion of the schematic illustration of FIG. 1 showing a preferred arrangement for separating unwanted non-condensible gases from system refrigeration solution constituents at system high side pressures for accumulation and periodic venting from the system to the atmosphere.

DETAILED DESCRIPTION

Figure 1:
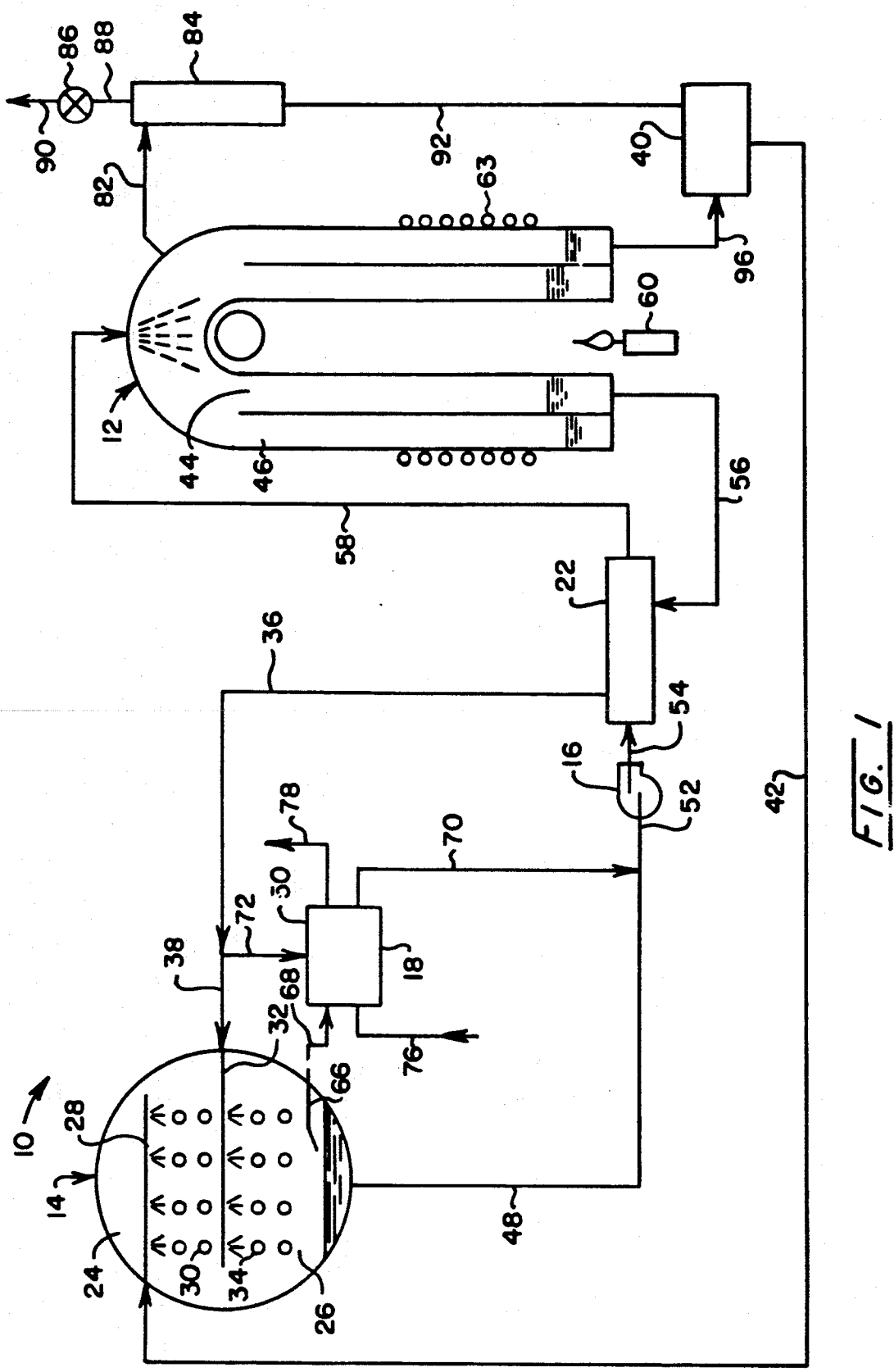
FIG. 1 is a schematic elevational diagram, partly in section, of a preferred embodiment of the absorption refrigeration system of this invention.

FIG. 1 schematically illustrates an assembled absorption refrigeration system 10 which includes a preferred embodiment of the purge subsystem of this invention. The principal subassemblies of system 10 include generator/condenser sub-assembly 12, evaporator/absorber sub-assembly 14, and a refrigeration solution pump sub-assembly 16. Other elements included in system 10 include an auxiliary absorber 18, which functions essentially as a low-pressure differential purge pump, an absorber section liquid sump 20, a liquid-to-liquid heat exchanger 22, and various fluid lines interconnecting assemblies 12 through 22 in fluid flow relationship in the manner shown.

Basically, system 10 is a sub-atmospheric type absorption refrigeration system utilizing water vapor as the system refrigerant and a water and lithium bromide solution as the system refrigerant solution. Sub-assembly 14 has an evaporator section 24, an absorber section 26, and typically may operate at an internal minimum sub-atmospheric pressure of approximately 10-15 millimeters of mercury (0.02 psia). Liquid refrigerant (water) is introduced into section 24 through spray tube 28 at an elevated tube pressure that typically is as high as 45 psia and in heat transfer relation to load heat exchanger 30 for evaporation. Evaporated liquid refrigerant is then mass transferred via absorber section 26 into combination with relatively concentrated refrigerant solution sprayed into absorber section 26 through spray tube 32 also at an elevated high-side pressure such as approximately 45 psia. Additional cooling load heat is transferred from the system load into the absorber section refrigerant and liquid refrigerant solution combination through additional load heat exchanger coils or tubes 34. In the FIG. 1 arrangement, relatively concentrated refrigerant solution is flowed to spray tube 32 from liquid-to-liquid counterflow heat exchanger 22 through flow line elements 36 and 38. Liquid refrigerant is flowed to spray tube 28 from refrigerant collector 40 through flow line 42.

Subassembly 12 is preferably comprised of a generally annular generator section 44 and an adjoining generally annular condenser section 46. Relatively dilute refrigerant solution collected in the lower portion of absorber section 26 is flowed through line segment 48 and then through line segment 52 to the inlet of solution pump 16 at the system low side sub-atmospheric pressure level (e.g., 5-10 mm. Hg). After the relatively dilute refrigerant solution has been pumped to the system high-side pressure level (e.g., 45 psia) by pump means 16, it is flowed through line segment 54 to counterflow heat exchanger 22 so as to cool liquid refrigeration solution transferred from generator section 46 by way of flow line segment 56. The relatively dilute refrigerant solution heated in heat exchanger assembly 22 is flowed through line segment 58 to be sprayed at the upper inlet opening of subassembly 12 over the innermost interior surface of annular generator section 44 for evaporation by heat obtained from heat source 60 during dilute refrigerant solution gravity flow. Refrigerant vapors produced in annular generator section 44 pass over the end of cylindrical divider wall 62 and are condensed as liquid refrigerant (water) in condenser section 46 (by the effect of heat exchanger coil 63) for accumulation at the condenser section lower extremity. The so condensed liquid refrigerant (water) is then flowed through line segment 96 and collected in collector subassembly 40 for subsequent flow to evaporator section 24 through line segment 42.

It is well known that unwanted and so called non-condensible gases (e.g., nitrogen, hydrogen, etc.) which exist is an absorption refrigeration system normally accumulate in the system absorber section 26, and if not continuously or at least intermittently purged from that section will cause system refrigeration performance degradation or impairment. To overcome such a system operating impairment, I provide a system low pressure differential pump assembly 50 which in FIG. 2 takes the form of an auxiliary absorber 64. In other embodiments of the invention pump means 50 may take the form of an educator pump driven by bleed pressurized concentrated refrigerant solution if adequate entrainment and an adequate pressure differential can be developed, or the form of a full jet educator pump means driven by bleed dilute refrigerant solution taken from the high pressure side of pump means 16.

In either case, the function of pump means 62 is to flow accumulated, unwanted, non-condensible gases received from absorber section 26 through purge tube 66 and flow line segment 68 to the inlet of solution pump means 16 by way of connected line segment 70 and sump 50. Such is normally accomplished with an accompanying flow of mixed excess refrigerant vapor.

Referring to the embodiment of pump means 62 detailed as auxiliary absorber 64 in FIG. 2, purged gases flowed into assembly 64 through line segment 68 are collected at a reduced pressure produced by the refrigeration action of a bleed portion of concentrated refrigerant solution flowed from lines 36 and 38 through bleed line 72 into auxiliary absorber 64 and its cooling by heat exchanger coil 74. Coil 74 in one embodiment may receive cooling tower water from inlet line 76. After heating the cooling tower water flowed to outlet line 78 for discharge or re-cooling. Purge gases received in pump means 64 are subsequently flowed to sump 50, along with accumulated relatively concentrated refrigerated solution accumulated in the lower extreme of the chamber of auxiliary absorber 64, by means of conventioned syphon tube (fall tube) 80. The lower extreme of element 80 is preferably located as close to the inlet of solution pump 16 as is possible and practical. Unwanted gases introduced into solution pump 16 along with relatively dilute refrigeration solution are then pumped to the system high side operating pressure with relatively dilute refrigeration solution.

System 10 also includes means for subsequently isolating and separating the unwanted gases from refrigerant and refrigerant solution of the system high side operating pressure and for venting the separated unwanted gases from the system to the atmosphere which generally is about 15 psia. That means basically comprises isolation line segment 82, collector element 84, vent valve 86 and vent lines 88, 90.

Collector 84 may be constructed as an integral part of collector 40 or, if separate, may be connected to collector tube 40 by separate line segment 92. The inlet opening for isolation tube 82 preferably communicates with the uppermost interior region of generator/condenser assembly 12 to receive separated un-wanted non-condensibles, and is positioned to intercept a minimum of any refrigerant vapor, or more importantly, liquid refrigeration solution flowed from the outlet of line segment 58.

One particular embodiment of the combination of elements 82, collector(s) 40, 84, and vent apparatus 8614 90 is illustrated schematically in FIG. 3. In the FIG. 3 arrangement flow line 82 takes the form of an inverted, generally U-shaped tube contained interiorly of condenser section 46 and collectors 40 and 84, and arranged to have its inlet and outlet openings located near the upper extremes of the interior chambers of condenser section 46 and collector 84, respectively. The lower portion of U-shaped tube 82 is provided with drain opening 94 which permits any refrigerant vapors condensed in the vertical legs of tube 82 to drain into the liquid refrigerant accumulated in collector 40 for return to evaporator section 24 of assembly 14. Alternatively, tube 82 might be made to pass from condenser section 46 to collector 84 directly in the manner suggested by the schematic illustration of FIG. 1.

Unwanted non-condensible gases accumulated in the upper region of collector 84 may be periodically vented to the atmosphere by actuation of conventional valve means 86 either manually or automatically. If accomplished automatically, opening and closing of valve means 86 is preferably made responsive to a sensed temperature condition within collector 84 and indicative of the level of the interface between accumulated non-condensible gases and accumulated liquid refrigerant.

It is herein understood that although the present invention has been specifically disclosed with the preferred embodiments and examples, modifications and variations of the concepts herein disclosed may be resorted to by those skilled in the art. Such modifications and variations are considered to be within the scope of the invention and appended claims.

I claim:

1. An absorption refrigeration system with a gas purge system comprising:
   a.) Absorber means functioning at a sub-atmospheric operating pressure and separating un-wanted, non-condensed gases from refrigeration solution;
   b.) generator means functioning at an operating pressure substantially greater than atmospheric pressure and separating refrigerant vapor and un-wanted, non-condensed gases from refrigeration solution;
   c.) purge pump means receiving un-wanted, non-condensed gases from said absorber means at a pressure less than said absorber means sub-atmospheric operating pressure;
   d.) solution pump means receiving refrigeration solution from said absorber means and un-wanted, non-condensed gases from said purge pump means and flowing received gases and refrigeration solution to said generator means;
   e.) collector means receiving un-wanted, non-condensed gases from said generator means at an operating pressure corresponding to said generator means operating pressure; and
   f.) vent means venting said un-wanted, non-condensed gases from said collector means to the atmosphere at a venting pressure corresponding to said generator means operating pressure.

2. The invention defined by claim 1 wherein said purge pump means is an auxiliary absorber driven to an auxiliary absorber operating pressure lower than said absorber means sub-atmospheric operating pressure by a bleed fraction of refrigeration solution otherwise flowed to said absorber means.

3. The invention defined by claim 1 wherein said purge pump means is an educator, said educator being driven by a bleed fraction of refrigeration solution.

4. The invention defined by claim 3 wherein said bleed fraction of refrigeration solution is relatively concentrated refrigeration solution.

5. The invention defined by claim 3 wherein said bleed fraction of refrigeration solution is relatively dilute refrigeration solution.

6. A method of purging un-wanted, non-condensed gases from an absorption refrigeration system, comprising the steps of:
   a.) removing unwanted, non-condensed gases from an absorption refrigeration system absorber element which functions at a sub-atmospheric operating pressure;
   b.) separately removing relatively dilute refrigeration solution from the absorption refrigeration system absorber element;
   c.) entraining said un-wanted, non-condensed gases in said relatively dilute refrigeration solution and flowing said fluids to an absorption refrigeration system generator element which functions at an operating pressure substantially greater than atmospheric pressure;
   d.) separating said un-wanted, non-condensed gases from refrigeration solution in said generator element and removing said un-wanted, non-condensed gases from said generator element at said generator element operating pressure; and
   e.) venting said un-wanted, non-condensed gases removed from said generator element to the atmosphere at said generator element operating pressure.

* * * * *